Patented Nov. 9, 1948

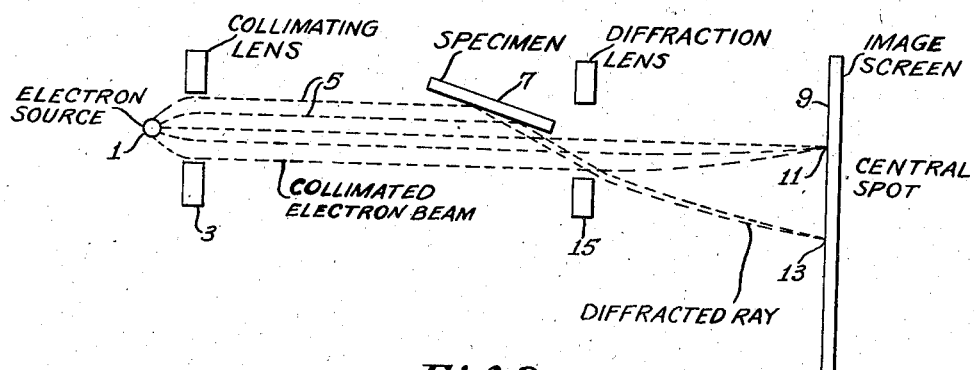
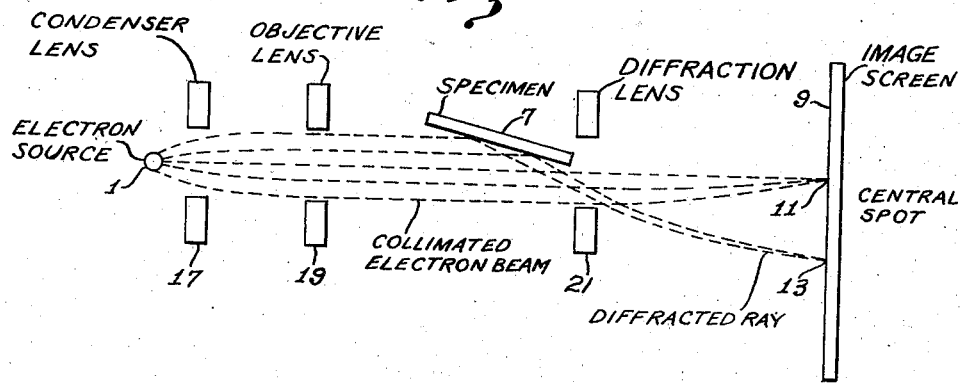

2,453,412

UNITED STATES PATENT OFFICE 2,453,412

ELECTRON DIFFRACTION SYSTEM AND METHOD

Norman R. Davidson, Princeton, N. J., assignor to Radio Corporation of America, a corporation of Delaware Application June 28, 1946, Serial No. 679,986

8 Claims. (Cl. 250—49.5)

This invention relates generally to electron optical systems and methods and more particularly to improved methods of and means for deriving electron diffraction patterns by reflection from a relatively large area of an opaque specimen surface.

In surface reflection electron diffraction work, different elements of the surface from which the electrons are diffracted are located at different distances from the electron image screen and also at different distances from the electron source. For this reason, the requirements for obtaining a sharply focused reflection diffraction pattern are much more stringent than the requirements for obtaining a sharply focused electron diffraction pattern by electron transmission through a relatively transparent specimen. In the latter instance substantially all of the elements of the specimen which diffract the electrons are at substantially uniform distances from the image screen and from the electron source, whereby it is sufficient to employ a single lens or lens system on either side of the specimen to focus the electron source at the image screen.

In the instant invention, it is desirable that a relatively large area of the specimen surface be irradiated by the electron beam and hence diffract electrons to the image screen. Since the various specimen surface elements are disposed at relatively widely differing distances from the electron source and from the image screen, it is essential that the electron optical system be so designed that all of the electrons which are diffracted by the specimen as particular predetermined diffraction angles will be focused to provide sharply defined diffraction rings at the image screen. Hence the electron optical system must be so proportioned that the distance from the specimen to the image screen and to the source is uncritical.

A practical realization of an electron optical system meeting these requirements comprises an electron source located at the focal plane of an electron collimating lens which thereby produces a parallel beam of electrons which irradiates a predetermined relatively large area of the opaque specimen. The collimated electron beam is caused to impinge upon the specimen surface at a very slight angle therewith, thereby causing electron diffraction by reflection from the specimen surface as a function of the composition of the specimen. A second or diffraction lens is situated between the specimen and the electron image screen or photographic plate, the focal plane of the second lens coinciding with the plane of the image screen. All electron rays scattered in a predetermined diffraction angle thus are focused in a single ring or point on the image screen. An extremely strong, clearly defined diffraction pattern may be obtained since a relatively large area of the specimen surface is electron irradiated. Because of the focusing action of the second lens the sharpness of the diffraction pattern is not impaired by the fact that different portions of the diffracting specimen are located at different distances from the electron source and the image screen.

Among the objects of the invention are to provide an improved method of and means for deriving electron diffraction patterns of a specimen. Another object is to provide improved methods of and means for deriving sharply focused electron diffraction patterns from the surface of a substantially electron opaque specimen. A further object of the invention is to provide improved methods of and means for deriving sharply focused electron diffraction patterns from a relatively large area of an electron irradiated specimen. An additional object is to provide improved methods of and means for deriving sharply focused electron diffraction patterns from an electron irradiated substantially opaque specimen by reflection and diffraction of electron rays from the specimen surface. A further object is to provide improved methods of and means for deriving sharply focused electron diffraction patterns from a substantially electron opaque specimen wherein the focus of the diffracted rays on the image screen is substantially independent of the spacing of the specimen from the electron source and the image screen. Another object of the invention is to provide an improved method of and means for deriving relatively intense electron diffraction patterns from substantially electron opaque specimens having relatively poor electron diffraction characteristics.

The invention will be described in further detail by reference to the accompanying drawings of which Figure 1 is a schematic diagram of a preferred embodiment thereof, and Figure 2 is a schematic diagram of a modification of said preferred embodiment of the invention. Similar reference characters are applied to similar elements throughout the drawing.

Referring to Figure 1 of the drawing, an electron source 1, such for example as a thermionic cathode of the type employed in conventional electron microscopes, is located at the focal plane of an electron collimating lens 3 which thereby provides a plurality of parallel electron rays 5. The parallel disposed electron rays 5 thereby provide a collimated electron beam having any desired cross-sectional area. A portion of the collimated electron beam impinges grazingly upon the surface of a specimen 7 which is disposed at a very small angle with respect to the axis of the electron beam. Electron diffracted from the reflecting surface of the specimen 7 are projected toward an electron sensitive image screen 9, such as a fluorescent screen or photographic plate. The diffraction angle of the diffracted electrons will depend upon the composition of the specimen surface. Other portions of the collimated electron beam which do not impinge upon the specimen surface are directed toward a central spot 11 on the image screen. A particular diffraction angle of the specimen diffracted electrons is directed and focused toward a second spot 13 on the image screen. All of the electrons projected toward the image screen are sharply focused thereon by a second electron diffraction lens 15 disposed between the specimen and the image screen and having its focal plane coinciding with the plane of the image screen. Both the collimating lens 3 and the second lens 15 may be of conventional electrostatic or electromagnetic types commonly employed in electron microscopes.

Since the electron source is at the focal plane of the collimating lens, and the image screen is at the focal plane of the second lens, the fact that a relatively large area of the specimen surface is electron irradiated and therefore diffracts electrons therefrom does not affect the sharpness of focus of the differently diffracted electron rays upon the image screen, whereby a sharply defined series of concentric rings are focused upon the image screen in accordance with the electron diffraction properties of the irradiated specimen area.

With the arrangement described the ring diameter is found to be independent of the specimen position and in accordance with the formula $$D = \frac{2f\lambda}{d} \quad (1)$$

wherein D is the ring diameter, $f$ is the focal length of the second lens, $\lambda$ is the deBroglie wavelength of the electron beam and $d$ is the interplanar spacing of a crystal of the specimen surface giving rise to the diffraction ring in question.

An important advantage of the instant invention is the ability of the system to provide a sharply focused electron diffraction pattern from a relatively large area of an opaque specimen surface. This condition permits intense diffraction patterns to be obtained from relatively poor electron diffraction surfaces wherein there is an extremely sparse population of the small surface crystalline projections which actually provide the electron diffraction.

The resolving power of the system described will be dependent upon the size of the effective electron source, and the adjustments and aberrations of the lenses employed. Aberrations in the second lens 15 located between the specimen and the image screen will be particularly critical, since this lens is required to focus electron rays which have been diffracted or scattered at relatively large angles with respect to and distances from the common electron beam and lens axis.

A practical realization of this system may be obtained by modifying the lens system of a conventional electron microscope, for example, such as the RCA Model EMU. The standard microscope may be modified by removing the objective and projector lens pole pieces. A reduced image of the electron source or cathode is formed by the condenser lens 17 and collimated to a parallel beam by the objective lens 19. Alternatively, a parallel beam of electrons may be formed directly from the electron source by utilizing the condenser and objective lenses 17, 19, respectively, as a combined weak lens system as shown in Figure 2 of the drawing, wherein the specimen 7 is located between the diffraction lens 21 and the objective lens 19. The usual projection lens of the microscope is not energized. The parallel beam of electrons derived from the condenser-objective lens system is caused to impinge upon the diffracting surface of the specimen supported in the conventional reflection specimen holder of the electron microscope. The power of the diffraction lens 21 of the microscope, located between the reflection specimen holder and the image screen, is adjusted so that its focal plane coincides with the plane of the image screen and thereby focuses the diffracted electron beam on the screen.

The instant system has been operated utilizing both ⅛″ and ⅟₂₀₀″ electron apertures in the specimen support. Sharply focused intense diffraction patterns of etched copper surfaces, and of magnesium oxide smoke collected on copper surfaces, have been obtained. In a specimen of magnesium oxide smoke collected on a copper surface, it is possible to observe the actual area exposed to the irradiating electron beam since the magnesium oxide fluoresces under electron bombardment. With the larger beam aperture, sharply focused diffraction patterns have been obtained with a specimen bombardment surface area of 1.5 x 10 mm. With the smaller electron beam aperture, high resolution diffraction patterns have been obtained in which the area of electron bombardment on the specimen surface was ⅟₁₀ x 5 mm.

Thus the invention described comprises improved methods of and means for deriving sharply focused electron diffraction patterns from the surface of substantially electron opaque specimens wherein a relatively large area of the specimen surface is electron irradiated at a small angle with respect to the specimen surface plane. Electrons diffracted from the various elements of the specimen surface at relatively widely differing distances from the electron image screen are sharply focused thereon by a diffraction lens having its focal plane coinciding with the plane of the image screen.

I claim as my invention:

1. The method of electron diffraction of a specimen comprising producing a beam of electrons of substantial cross-sectional area, said beam comprising a plurality of parallel disposed electron rays, applying a substantial portion of said beam at an obtuse angle to a substantial portion of the surface of said specimen to irradiate said portion of said surface, deriving a plurality of diffracted electron rays from said irradiated surface, and focusing said diffracted rays to provide a focused electron diffraction image characteristic of the composition of said specimen irradiated surface portion.

2. The method of electron diffraction of a specimen comprising producing a beam of electrons of substantial cross-sectional area, said beam comprising a plurality of parallel disposed electron rays, applying a substantial portion of said beam grazingly to a substantial portion of the surface of said specimen to irradiate said portion of said surface, deriving a plurality of diffracted electron rays from said irradiated surface, and focusing said diffracted rays to provide a focused electron diffraction image characteristic of the composition of said specimen irradiated surface portion.

3. An electron diffraction system for determining the composition of a specimen including means for producing a beam of electrons having substantial cross-sectional area and comprising a plurality of parallel-disposed electron rays, means for applying said beam grazingly to said specimen to irradiate a substantial portion of the surface of said specimen, a portion of said applied rays being diffracted by said specimen surface portion, an image screen, and an electron lens disposed between said specimen and said screen, said lens being operative to focus upon said screen said irradiating electrons which are diffracted by said specimen surface portion.

4. An electron diffraction system for determining the composition of a specimen including means for producing a beam of electrons having substantial cross-sectional area, means for focusing said beam to provide a plurality of parallel-disposed electron rays, means for applying said focused beam grazingly to said specimen to irradiate a substantial portion of the surface of said specimen, a portion of said applied rays being diffracted by said specimen surface portion, an image screen, and an electron lens disposed between said specimen and said screen, said lens being operative to focus upon said screen said irradiating electrons which are diffracted by said specimen surface portion.

5. An electron diffraction system for determining the composition of a specimen including an electron source for producing a beam of electrons having substantial cross-sectional area, an electron condenser lens in the path of said beam for focusing said beam for providing a plurality of parallel-disposed electron rays, means for applying said focused beam grazingly to said specimen to irradiate a substantial portion of the surface of said specimen, a portion of said applied rays being diffracted by said specimen surface portion, an electron image screen, and a second electron lens disposed between said specimen and said screen, said second lens being operative to focus upon said screen said irradiating electrons which are diffracted by said specimen surface portion.

6. An electron diffraction system for determining the composition of a specimen including an electron source for producing a beam of electrons having substantial cross-sectional area, an electron condenser lens system in the path of said beam having its focal plane coinciding with said source for focusing said beam to provide a plurality of parallel-disposed electron rays, means for applying said focused beam grazingly to said specimen to irradiate a substantial portion of the surface of said specimen, a portion of said applied rays being diffracted by said specimen surface portion, an electron image screen, and a second electron lens disposed between said specimen and said screen, the focal plane of said second lens coinciding with the plane of said screen, said second lens being operative to focus upon said screen said irradiating electrons which are diffracted by said specimen surface portion.

7. An electron diffraction system for determining the composition of a specimen including an electron source for producing a beam of electrons having substantial cross-sectional area, a pair of electron lenses in the path of said beam cooperating to focus said beam to a plurality of parallel-disposed electron rays, means for applying said focused beam grazingly to said specimen to irradiate a substantial portion of the surface of said specimen, a portion of said applied rays being diffracted by said specimen surface portion, an electron image screen, and an electron projection lens disposed between said specimen and said screen, the focal plane of said projection lens coinciding with the plane of said screen, said projection lens being operative to focus upon said screen said irradiating electrons which are diffracted by said specimen surface portion.

8. An electron diffraction system for determining the composition of a specimen including means for producing a beam of electrons having substantial cross-sectional area and comprising a plurality of parallel-disposed electron rays, an electron image screen, an electron lens disposed between said beam producing means and said screen, said screen being at the focal plane of said lens, a specimen located between said beam producing means and said lens, the surface of said specimen being at a small angle with the axis of said electron beam, means for applying said beam grazingly to said specimen to irradiate a substantial portion of the surface of said specimen, a portion of said applied rays being diffracted by said specimen surface portion, and said lens being operative to focus upon said screen said irradiating electrons which are diffracted from all points on said specimen surface portion.

NORMAN R. DAVIDSON.

REFERENCES CITED

The following references are of record in the file of this patent:

UNITED STATES PATENTS

| Number | Name | Date |
| --- | --- | --- |
| 2,281,325 | Ramo | Apr. 28, 1942 |

OTHER REFERENCES

"Studies with the Electron Microscope Diffraction Adapter," Richard G. Picard, RCA Victor Div., Radio Corp. of America, Camden, N. J. (Rec. June 13, 1944) pp. 678–684. 250–49.5. (Copy in Div. 54.)